Patented Dec. 4, 1951  2,577,590

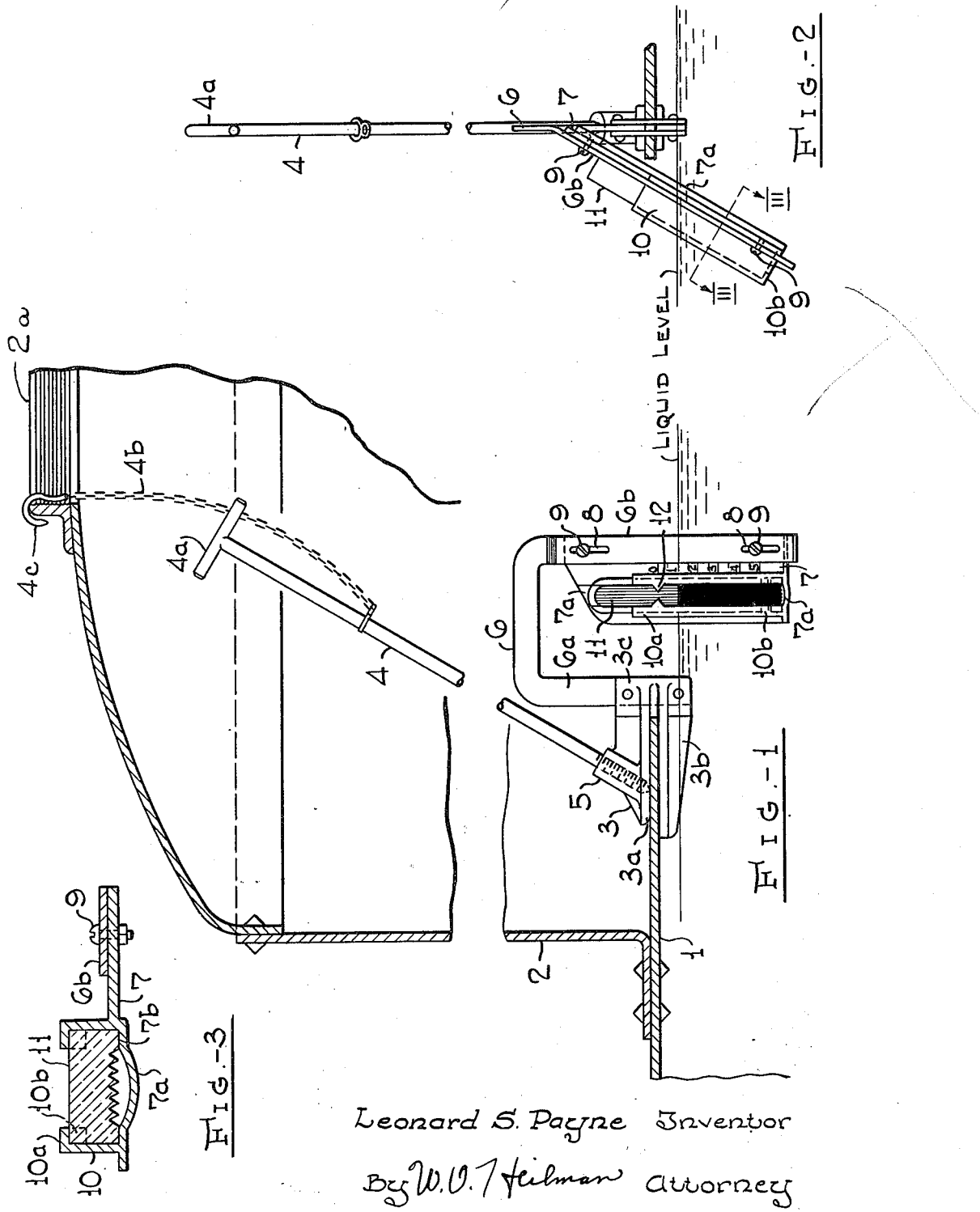
Dec. 4, 1951 L. S. PAYNE 2,577,590
LIQUID GAUGING DEVICE
Filed July 19, 1950
Leonard S. Payne Inventor
By W. V. T. Heilman Attorney

UNITED STATES PATENT OFFICE 2,577,590

LIQUID GAUGING DEVICE

Leonard S. Payne, Sarnia, Ontario, Canada, assignor to Standard Oil Development Company, a corporation of Delaware Application July 19, 1950, Serial No. 174,660

4 Claims. (Cl. 73—290)

The present invention relates to a means for gauging liquid levels, and more particularly to a liquid level gauging device adapted to permit visual determination of the level of a liquid in a container vessel relative to a fixed reference element in or forming a part of said vessel. The invention is further concerned with providing a means for gauging liquid levels in tank cars.

In gauging a container vessel such as a tank car, the quantity of liquid in the vessel may be determined by measuring either the depth of such liquid in the vessel—"innage" measurement—or the distance of the liquid surface from a fixed reference surface or element, which may be the uppermost wall surface of the vessel— "outage" measurement. The measurements obtained may be employed to determine the quantity of liquid in the vessel, by reference to standard volumetric tables for the vessel gauged.

It is an object of the present invention to provide an "outage" gauging device which is simple, and of relatively light construction. It is also an object of the invention to provide such a gauging device which facilitates the procurement of accurate readings when the gauge is viewed under the difficult conditions imposed by poor light and distance from the observer.

The invention and its objects may be more fully understood from the following description when read in conjunction with the accompanying drawings, in which:

Fig. 1 is a side elevational view of the device in operating relation to the crown sheet of a tank car dome, the car and dome portions being illustrated in fragmentary, and vertical section.

Fig. 2 is an end view of the device from the right side of the illustration according to Fig. 1, including a portion of the crown sheet, and Fig. 3 is a horizontal section through a portion of the device taken along the line III—III of Fig. 2.

Referring more particularly to the drawings, numeral 1 designates a fixed reference element in a container vessel which may be employed for determining liquid levels therein. As illustrated in Fig. 1, this element is the uppermost portion of a tank car wall at the opening thereof into the tank car dome 2, the structure being conventional and the dome provided with a normally covered opening 2a. The numeral 3 designates a clamp member having upper and lower jaw portions 3a and 3b respectively, rigidly connected at one end in vertically spaced relationship by means of a yoke portion 3c. The clamping member is adapted to engage a fixed reference element such as the wall or crown sheet portion 1 of a tank car vessel interiorly of the dome 2. The clamp is provided for rigid engagement with the element 1 by means of a rod 4 adapted for threaded engagement at one end with an interiorly threaded hollow boss 5 integral with the upper jaw portion 3a and opening therethrough. The other end of the rod 4 is provided with a cross bar handle 4a by means of which the rod may be threaded into and through the boss to engage the upper surface of the element 1 and exert pressure thereon. Retainer chain and hook 4b and 4c may be provided to prevent accidental loss of the device in use.

Carried by the clamp member yoke portion 3c is a substantially J-shaped support arm 6 rigidly secured to the yoke portion 3c, and in an inverted position, by the shorter leg 6a of the arm, with the longer leg portion 6b thereof depending below the clamp member. The support arm 6 in turn carries a liquid level gauging element including a bracket member 7 and a gauge glass 11 mounted thereon. The bracket and leg portion 6b of the support arm 6 are provided for longitudinal adjustment of the bracket with reference to the leg portion as by means of the slotted portions 8 in the leg portion 6 and the screws 9 passed therethrough to engage the bracket. If desired, of course, the slots may be provided in the bracket rather than in the leg portion 6b. Although, as shown, the bracket is mounted inwardly of the leg portion 6b, so as to lie between the leg portion 6a and 6b, if desired, it may be mounted so as to extend laterally outwardly from the leg portion 6b.

As shown in the drawings, and more particularly in the illustration of Fig. 3, the bracket 7 is provided with a longitudinal recessed portion 7a extending from one end of the bracket to the other with upstanding parallel wall portions 10 disposed in spaced relation to the lateral edges of the recess 7a so as to form a longitudinal shoulder 7b on each side of the recess and adjacent to each wall 10. The outer end of the wall portions 10 are inwardly flanged as at 10a and at the lower end of these wall portions are provided oppositely disposed lugs or flanges 10b. By this means is formed an open faced receptacle adapted to receive the gauge glass 11. The gauge glass is a reflex glass member having a smooth, obverse surface exposed between the flange portions 10a and a prismatically grooved reverse surface facing and spaced from the surface of the recess 7a. The gauge glass and recess form between them an open end hollow liquid receiving element. The grooves in the reverse surface of the glass are angular in form, and so disposed that when the medium in contact with the angular groove surfaces is air, light striking the obverse surface is reflected back through that surface as from a mirror. When the medium in contact with the reverse surface is a liquid, however, no reflection takes place at the grooved surfaces, the incident light beams passing into and through the liquid medium to strike the surface of the recess in the bracket. Where the hollow gauge element is not completely filled with liquid, the level therein is sharply defined by the mirror-like reflexion from the angular groove portions of the glass not in contact with the liquid. If the surface of the recess 7a opposed to the reverse surface of the glass is darkly pigmented, the liquid level will be sharply defined where the liquid surface meets the grooves in the glass. The glass is substantially shielded from light, other than that incident to the obverse surface of the glass, by means of the enclosing walls and flange portions 10 and 10a respectively. Preferably, the flange portions 10a are formed so as to provide opposed indicating elements 12 intermediate the length of said flange portions and adjacent the upper end thereof extended toward each other over the face of the gauge glass 11. The entire inner surface of the recess portion 7a which faces the reverse surface of the gauge glass is darkly pigmented, preferably being painted black, and the leg portion 6b is preferably bent upwardly along a line above the bracket 7 so as to hold the bracket and gauge at an angle to the vertical and provide for easier observation from above. The bracket member 7 also carries a scale suitably impressed or marked thereon showing the distance in inches from the pointer elements 12 downwardly to the lower end of the gauge glass.

In operation, the bracket 7 is adjusted on the leg portion 6b so that the pointer elements 12 are in a line coincident with a plane common to the upper surface of the lower jaw 3b of the clamp 3. The clamp 3 is then engaged with a fixed reference element such as the element 1 and the clamp fixedly secured with reference thereto by threading the rod 4 through the boss 5 into engagement with the upper surface of the element 1. When thus engaged, the leg portion 6b will depend below the fixed element 1 substantially to the extent it is normally dependent below the clamp member 3 and the pointer elements 12 will be disposed with reference to the lower surface of the element 1 in the same manner as with reference to the upper surface of the lower jaw portion 3b. With the upper surface of the liquid in the vessel above the lower end of the bracket and gauge glass, liquid will enter the hollow recess portion behind the glass and, by changing or modifying the reflective characteristics of the reverse prismatic surface, the level thereof in the recess will be sharply delineated. The liquid level thus indicated is readable from the bracket scale, as the distance in inches from the pointers 12, and thereby from the reference element 1. This measurement then may be converted to a determination of the volume of liquid in the vessel by reference to a standard "outage" measurement conversion table for the vessel. In Fig. 1, the liquid level is shown as one inch below the pointers 12 and reference element 1.

I claim:

1. A liquid level gauging device, comprising a mounting clamp member, said member having opposed upper and lower jaw portions, means for rigidly engaging said member with a fixed reference element for determining liquid levels in a container vessel with said element disposed between said jaw portions when thus engaged, a substantially J-shaped support arm secured in inverted position by the shorter leg portion thereof to said clamp member, with the longer leg portion depending below said clamp member, an open ended hollow, liquid receiving, gauge element supported on said longer leg portion of said arm with a major portion of the length of said gauge element extending below said clamp, said gauge element having an upper and a lower end and a reflex glass viewing face, fixed pointer means associated with said gauge element, and the glass face thereof, adjacent the upper end of said element, and adjustable means for positioning said gauge element with reference to the clamp to establish said pointer means in the same plane with the upper face of said clamping member lower jaw portion.

2. A liquid level gauging device according to claim 1, in which said gauge element is substantially integral with a bracket mounted on said support arm longer leg portion for adjustment longitudinally thereof.

3. A liquid level gauging device according to claim 1, in which said gauge element is a bracket member mounted longitudinally of said support arm longer leg portion, a recess portion longitudinally of said bracket, and retainer means carried by said bracket adapted to receive and hold a reflex glass over said recess portion and in spaced relation thereto.

4. A liquid gauging device according to claim 1, in which the clamp member longer leg portion is inclined laterally with reference to said member.

LEONARD S. PAYNE.

REFERENCES CITED

The following references are of record in the file of this patent:

UNITED STATES PATENTS

| Number | Name | Date |
| --- | --- | --- |
| 1,264,143 | Bennett | Apr. 30, 1918 |
| 1,818,295 | Bohnhardt | Aug. 11, 1931 |
| 2,027,145 | Beebe | Jan. 7, 1936 |